US012749306B1

(12) United States Patent

Escandon

(10) Patent No.: US 12,749,306 B1

(45) Date of Patent: Sep. 29, 2026

(54) STRUCTURE CHANGE DETECTION USING IMAGE SEGMENTATION

(71) Applicant: United Services Automobile Association (USAA), San Antonio, TX (US)

(72) Inventor: Rodrigo Escandon, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 302 days.

(21) Appl. No.: 18/240,907

(22) Filed: Aug. 31, 2023

(51) Int. Cl.

| | |
|---|---|
| ***G06V 20/10*** | (2022.01) |
| ***G06Q 40/08*** | (2012.01) |
| ***G06T 7/00*** | (2017.01) |
| ***G06T 7/62*** | (2017.01) |
| ***G06V 10/25*** | (2022.01) |
| ***G06V 10/26*** | (2022.01) |
| ***G06V 10/44*** | (2022.01) |
| ***G06V 10/74*** | (2022.01) |
| ***G06V 10/764*** | (2022.01) |

(52) U.S. Cl.

CPC ........... *G06V 20/176* (2022.01); *G06Q 40/08* (2013.01); *G06T 7/62* (2017.01); *G06T 7/97* (2017.01); *G06V 10/25* (2022.01); *G06V 10/26* (2022.01); *G06V 10/44* (2022.01); *G06V 10/761* (2022.01); *G06V 10/764* (2022.01); *G06T 2200/24* (2013.01); *G06T 2207/10032* (2013.01); *G06T 2207/20104* (2013.01); *G06T 2207/30184* (2013.01)

(58) Field of Classification Search

CPC ...... G06V 20/176; G06V 10/25; G06V 10/26; G06V 10/44; G06V 10/761; G06V 10/764; G06Q 40/08; G06T 7/62; G06T 7/97; G06T 2200/24; G06T 2207/10032; G06T 2207/20104; G06T 2207/30184

See application file for complete search history.

(56) References Cited

U.S. PATENT DOCUMENTS

| | | | | |
|---|---|---|---|---|
| 2020/0226745 | A1* | 7/2020 | Adler | G06T 7/73 |
| 2020/0312028 | A1* | 10/2020 | Charvat | G05D 1/101 |
| 2021/0089811 | A1* | 3/2021 | Strong | G06V 20/176 |
| 2021/0142123 | A1* | 5/2021 | Okazaki | G06N 3/08 |

(Continued)

FOREIGN PATENT DOCUMENTS

| | | | | |
|---|---|---|---|---|
| CN | 111160127 B | * | 7/2023 | G06V 20/13 |
| KR | 20230135532 A | * | 9/2023 | B25J 19/04 |

*Primary Examiner* — Andrew M Moyer

*Assistant Examiner* — Dylan John Mendez Muniz

(74) *Attorney, Agent, or Firm* — Fletcher Yoder, P.C.

(57) ABSTRACT

A system for detecting structures may include one or more processors that receive an aerial image associated with a property of interest, identify boundaries associated with the property of interest, apply a structure detection model to the aerial image to detect contours of one or more structures within the boundaries, and calculate a surface area of the detected one or more structures. In an embodiment, the structure detection model uses machine learning and past image data to identify one or more structures associated with a property of interest. The structure detection system may identify changes in an identified structure over time based on a calculated surface area in one or more subsequent aerial images.

20 Claims, 8 Drawing Sheets

(56) References Cited

U.S. PATENT DOCUMENTS

| | | | | |
|---|---|---|---|---|
| 2022/0366485 | A1* | 11/2022 | Saeman | G06Q 10/20 |
| 2023/0089375 | A1* | 3/2023 | Okuda | A61B 5/7275<br>382/128 |
| 2023/0118181 | A1* | 4/2023 | Matowitz | G06T 7/33<br>348/144 |

* cited by examiner

STRUCTURE CHANGE DETECTION USING IMAGE SEGMENTATION

BACKGROUND

This section is intended to introduce the reader to various aspects of art that may be related to various aspects of the present disclosure, which are described and/or claimed below. This discussion is believed to help provide the reader with background information to facilitate a better understanding of the various aspects of the present disclosure. Accordingly, it is understood that these statements are to be read in this light, and not as admissions of prior art.

Many property owners initiate changes and modifications to their property over time. For example, property owners may add-on to an existing property, build an attached garage, add outbuildings, and the like. In other cases, property owners may demolish portions of the property, reducing an overall footprint. Such additions and/or demolitions are typically managed by a construction company, and a general contractor may handle permitting and other regulatory concerns. However, there are certain updates that are more typically managed by the property owner, who may not be aware of a benefit of notifying an insurance company of property changes. It is now recognized that there is a need for improving notification procedures for property owners who initiate property modifications.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In an embodiment, a system for detecting structures in an aerial image may include one or more processors that may receive an aerial image associated with a property of interest. The one or more processors may identify one or more boundaries associated with the property of interest. Further, the one or more processors may apply a structure detection model to the aerial image to detect contours of one or more structures located within the boundaries of the property of interest. Further, the one or more processors may calculate a surface area of the detected one or more structures.

In an embodiment, a method for detecting structural changes within a property of interest may include receiving a first set of aerial image data collected at a first timepoint, where the first set of aerial image data comprises the property of interest, and where the property of interest comprises one or more structures. The method may also include determining a type of structure of the one or more structures and determining one or more boundaries of the property of interest. Further, the method may include applying a structure detection model to the first set of image data based on the determine structure type. Applying the structure detection model may include masking other structures outside the one or more boundaries of the property of interest, isolating the one or more structures within the one or more boundaries of the property of interest, identifying a first set of contours of the one or more structures. The method may also include calculating a first surface area of the first set of contours of the one or more structures.

In an embodiment, a tangible, non-transitory, computer-readable medium may include computer-readable instructions that, when executed by one or more processors, cause the one or more processors to receive aerial image data associated with a property of interest and identify one or more boundaries of the property of interest. The instructions, when executed, may also cause the one or more processors to apply, using machine learning, a structure detection model to the aerial image data, to identify one or more structures within the one or more boundaries of the property of interest and contours of the one or more structures, where the machine learning is configured to utilize past image data to detect patterns that identify properties associated with structures. Further, the instructions, when executed, may also cause the one or more processors to calculate a surface area of one or more contours associated with the one or more structures and use the calculated surface area to detect changes in the surface area over time.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
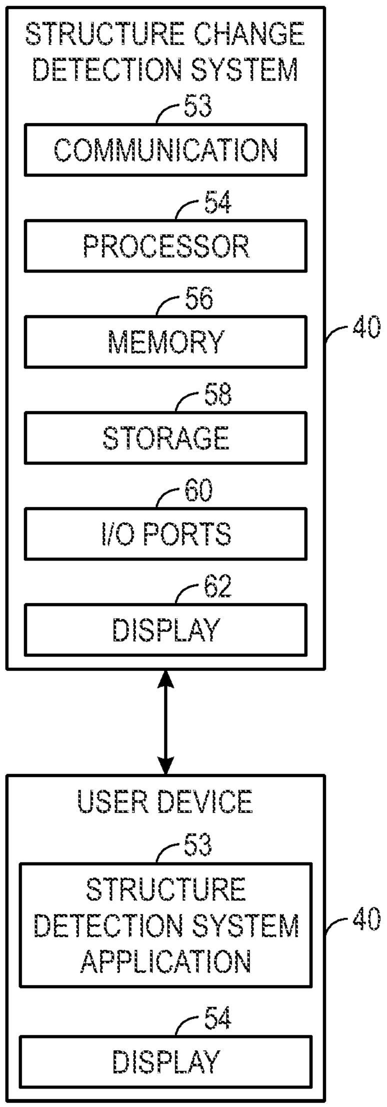
FIG. 1 illustrates a structure change detection system, according to one or more embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Maintaining accurate records for properties and structures on the properties is challenging. There can be different parties that may wish to be notified of significant property changes, such as local governments, home owners associations, mortgage issuers, renters, co-owners, property managers, and/or property insurers. However, there is no central notification system to allow a property owner to notify all parties of property changes. As such, a property owner may notify a local government of a property change via a permitting process, but may not be aware that the local government does not necessarily communicate property change information to other parties. The present techniques provide a system and method for automatically detecting structure changes for a property of interest. The disclosed embodiments permit structure change detection without the property owner initiating the evaluation. In this manner, a party having an interest in structure changes for a particular property of interest can be notified of structure changes without relying on self-reporting by the property owner or without scheduling periodic property inspections, which is time-consuming and burdensome.

The present disclosure relates generally to a structure detection system using a model for automatically detecting structures within a property of interest via aerial image data using image segmentation techniques. The present disclosure relates, in certain embodiments, to systems and methods of identifying a structure within a property of interest and calculating a surface area of one or more contours associated with the identified structure based on structure detection modeling and property line data. The calculated surface area may be calculated at different timepoints and compared to previous calculations or a baseline to determine whether there has been a change in surface area over time.

The present techniques, in an embodiment, facilitate image isolation of one property of interest of the one or more properties of interest and using the system to identify and/or outline any structures within the isolated property of interest and mask other structures outside the property of interest.

Accordingly, the present embodiments relate to structure detection and area calculation process within aerial image data using the combination of image segmentation methods and property line information. The image segmentation model may be given training data that includes aerial image data that has known property boundaries and pre-identified structure outlines within the images. The image segmentation model may utilize the training data to detect patterns and properties associated with geographical location of properties, tall structures, time of year the image data was collected, time of day the image data was collected, and the like.

An insurance provider may obtain aerial image data of a property and detect and segment structures from the aerial images, as well as use property line information to mask structures outside of the property of interest, and then calculate the area of each structure inside the property line. This may be done twice using aerial image data of the same home at two different periods of time (e.g. T1 and T2) with the intent of comparing the area at T1 and the area at T2 to determine if property additions have occurred. Structure changes on a property of interest may impact certain insurance policies (e.g., homeowners' insurance) associated with the property. Therefore, it may be beneficial to use aerial data of a property of interest, a structure detection modeling system, and property line information to determine whether there have been structure changes on the property, rather than the insurance provider manually surveying the property of interest to identify structural changes and calculating an area of the structures over time.

With the foregoing in mind, FIG. 1 a structure detection system 40 is provided. The structure detection system 40 may include any suitable computing device, cloud-computing device, or the like and may include various components to perform various analysis operations related to performing the embodiments described herein. By way of example, the structure detection system 40 may include a communication component 53, a processor 54, a memory 56, a storage component 58, input/output (I/O) ports 60, a display 62, and the like. The communication component 53 may be a wireless or wired communication component that may facilitate communication between different monitoring systems, gateway communication devices, various control systems, and the like. The processor 54 may be any type of computer processor (e.g., multi-core) or microprocessor capable of executing computer-executable code. The memory 56 and the storage component 58 may be any suitable articles of manufacture that can serve as media to store processor-executable code, data, or the like. These articles of manufacture may represent non-transitory computer-readable media (i.e., any suitable form of memory or storage) that may store the processor-executable code used by the processor 54 to perform the presently disclosed techniques. The memory 56 and the storage component 58 may also be used to store data received via the I/O ports 60, data analyzed by the processor 54, or the like.

The I/O ports 60 may be interfaces that may couple to various types of I/O modules such as sensors, programmable logic controllers (PLC), and other types of equipment. For example, the I/O ports 60 may serve as an interface to enable the structure detection system 40 to connect and communicate with surface instrumentation, servers, computing devices, and the like. Connection between the I/O ports 60 and surface instrumentation, servers, and other equipment may be a wireless or wired communication.

The display 62 may include any type of electronic display such as a liquid crystal display, a light-emitting-diode display, and the like. As such, data acquired via the I/O ports and/or data analyzed by the processor 54 may be presented on the display 62, such that the structure detection system 40 may present aerial image data of a property of interest. In certain embodiments, the display 62 may be a touch screen display or any other type of display capable of receiving inputs from an operator. Although the structure detection system 40 is described as including the components presented in FIG. 1, the structure detection system 40 should not be limited to including the components listed in FIG. 1. Indeed, the structure detection system 40 may include additional or fewer components than described above. Further, the components of the structure detection system 40 may also be included in the server 48, the computing device 50, the mobile computing device 52, and the like.

The structure detection system 40 may be in communication with a user device 63, such as a mobile device, a user computer or table, a user network terminal. In embodiments, the user device 63 may be associated with a property owner. In embodiments, the user device 63 may be a third-party user device. The user device 63 may include one or more components discussed with respect to the structure detection system 40 and described above (e.g., processor 54, communication circuitry 53, memory 56, and so on). In an embodiment, the user device 63 may operate a structure detection system application 65 having a user interface displayed on a display 66 to facilitate communication with the structure detection system 40.

With the foregoing in mind, the structure detection system 40 may implement a method to detect a structure (e.g. a house, a shed, a commercial building, or the like) using machine learning models. In an embodiment, the model of the structure detection system 40 uses image segmentation techniques. For instance, the structure detection system 40 may receive a first set of aerial image data of at least one structure and identify structure features from the first set of image data. A structure detection model may be generated based on the extracted features. The structure detection system 40 may then receive a second set of aerial image data of at least one different structure and predict the structure properties (i.e. outline the structure boundaries) based on the second set of image data and the structure detection model. Model parameters may be calibrated based on discrepancies between the predicted structure boundaries and the actual structure boundaries to increase model accuracy. The structure detection system 40 may then update the structure detection model based on the calibrated model parameters and store the updated structure detection model.

Keeping this in mind, the present embodiments described herein may include systems and methods for identifying and tagging detected structures on a property of interest (i.e. a property of an insurance member) based on aerial image data. By way of operation, the structure detection system 40 may receive the aerial image data and identify a set of structure characteristics defined by a structure detection model based on calibrated model parameters according to a process that will be described in greater detail below with reference to FIG. 2.

Figure 2:
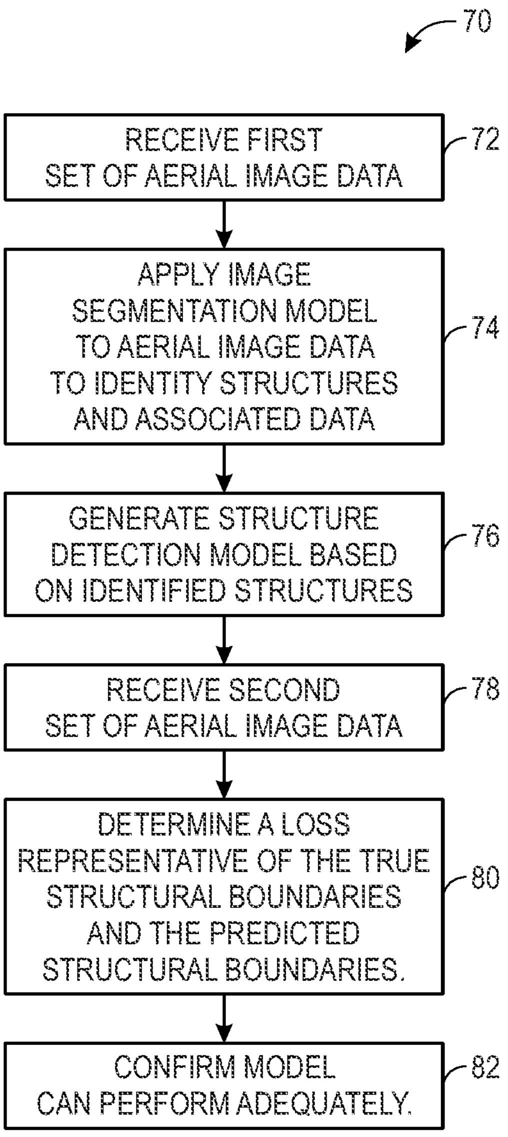
FIG. 2 illustrates a flow diagram of an example method for developing a structure detection model, in accordance with an aspect of the present disclosure.

Referring now to FIG. 2, FIG. 2 illustrates a flow chart of a method 70 for generating a structure detection model for identifying structures (e.g. a house, a shed, a commercial building, or the like) on a property of interest (e.g., property owned by an insured party or other party of interest, property in a particular geographic location). Although the following description of the method 70 will be described as being performed by the structure detection system 40, it should be noted that any suitable computing device may perform the method 70. Additionally, although the method 70 is described in a particular order, it should be understood that the method 70 may be performed in any suitable order.

As shown in FIG. 2, at block 72, the structure detection system 40 may receive a first set of aerial image data. In one embodiment, the first set of aerial image data may be sourced from a satellite imagery provider, a government agency, an online mapping platform, a drone or other unmanned aerial vehicle (UAV), a commercial imagery provider, or other data source or business. In any case, the first set of image data may be collected from image sensors (e.g., cameras) and may include images of one or more structures within an area that includes one or more properties (e.g., lots). In an embodiment, the first set of image data may be annotated and serve as training data for the embodiments described below to generate a structure detection model or the like. As such, the first set of image data may be collected from a variety of environments, with respect to a variety of types of structures, and the like. The image data may include metadata or other data characteristics that may provide time information, location information, information about the time of year, device information, user information, and other information that may be related to the depicted structures or environment in which the image data was acquired.

At block 74, the structure detection system 40 may apply an image segmentation model to the first set of aerial image data. That is, an image segmentation model may be applied to the first set of image data in order to identify the structures and associated data represented in the first set of image data. In this way, the structure detection system 40 may extract features of one or more structures depicted in the first set of image data. To accomplish this, in some embodiments, the structure detection system 40 may detect each structure in each individual frame of the first set of image data. Indeed, to enhance the detection or viewability of the features that may be indicative of structures, the structure detection system 40 may alter the image data using techniques such as image augmentation, horizontal flipping, adding noise, cropping, and the like.

In some embodiments, the individual frame with the detected structure may be segmented. That is, the individual frame with the detected structure may be divided into multiple image segments or image regions, consisting of a set of pixels. Each set of pixels may be assigned a label such that pixels with the same label may share certain characteristics. In one embodiment, the image segmentation may segment each individual pixel into a "structure" or "non-structure" category. After performing the image segmentation, the structure detection system 40 may collect a set of segments that cover the entire image, a set of contours extracted from the image, and the like. Each of the pixels in a region of the image that is similar with respect to some characteristic or property, such as color, intensity, or texture may be categorized as part of a segment of the image. For example, in the present disclosure, each segmented region of an individual frame containing a roof, for instance, may share some characteristic or property that may be classified as part of a structure.

The process of segmentation and extraction may be achieved using one or more popular image segmentation models such as mask regional convolutional neural network (MaskR-CNN), DeepLab, fully convolutional network (FCN), or other suitable interpolation/convolution technique. By way of example, MaskR-CNN is a recognized deep learning architecture, which may assist in object detection, segmentation, and classification of image data.

At block 76, the structure detection system 40 may generate a structure detection model representative of the structures based on the extracted features described above with respect to block 74. The structure detection model may be a multi-variable function or equation that relates image inputs with calibrated outputs using weights or model parameters, as determined using the techniques described above. In this way, the structure detection model characterizes the relationships or correlations between the extracted features of various structures and their effects or influences to the model. That is, the structure detection model may represent a connection between each feature and corresponding output result, provide a weight for each connection that corresponds to a strength of the correlation, and the like. As a result, the model parameters themselves may be tuned or calibrated to further minimize error and to more accurately recognize a structure within a property of interest represented in aerial image data, as described in more detail below.

At block 78, the structure detection system 40 may receive a second set of aerial image data having one or more additional unknown structures. That is, the second set of image data may be provided as a test set to determine whether the structure detection model may be used to accurately determine whether the structure detection system 40 may detect structures and their boundaries within a property of interest. Like the first set of image data in block 72, the second set of image data may be sourced from a satellite imagery provider, a government agency, an online mapping platform, a drone or other unmanned aerial vehicle (UAV), a commercial imagery provider, or other data source or business. Unlike the first set of image data, in which the properties and boundaries of a known structure were detected and extracted, the second set of image data may be of a similar class or context but may include undetected or unknown structures that may be predicted by the structure detection model generated at block 76. Thus, although the second set of aerial image data may have never-before-seen structures, the second set of image data may still be of a similar class or context, and, thus, the extracted structural features may be classified by the structure detection model and, therefore, may be recognized by the structure detection system 40 in the second set of image data.

At block 80, after the model predicts the properties and/or boundaries of the one or more structures in the second set of image data, a loss may be determined that is representative of the true structural boundaries and the predicted structural boundaries. In this way, as indicated by block 82, the second set of aerial images may be used to evaluate the variance or bias process to make sure the model is generalized and can perform adequately with non-trained data. The model parameters that create the lowest loss in the second set of aerial images may become the structure detection model.

Figure 3:
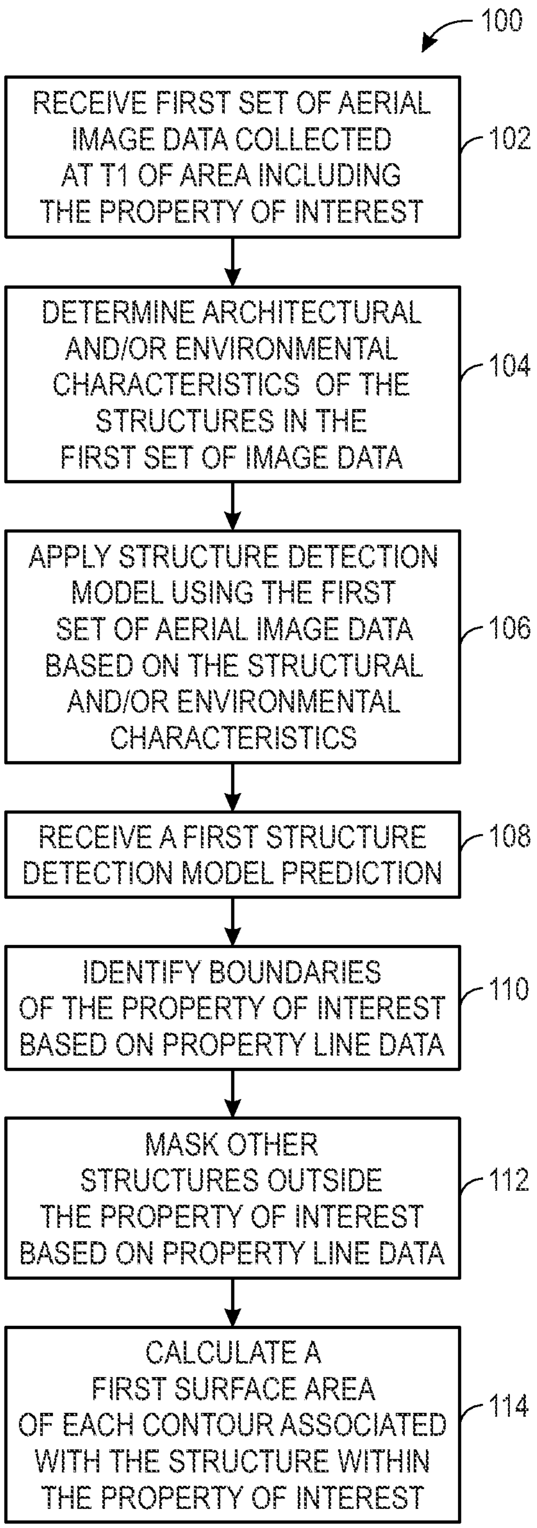
FIG. 3 illustrates a flow diagram of an example method of structure detection using the structure detection model, in accordance with an aspect of the present disclosure.

Referring now to FIG. 3, FIG. 3 a flow chart of a method 100 for detecting a structure via the structure detection model, in accordance with an aspect of the present disclosure. Although the following description of the method 100 will be described as being performed by the structure detection system 40, it should be noted that any suitable computing device may perform the method 100. Additionally, although the method 100 is described in a particular order, it should be understood that the method 100 may be performed in any suitable order.

As shown in FIG. 3, at block 102, the structure detection system 40 may receive aerial image data of an area including the property of interest collected at a first timepoint (e.g. T1). Alternatively, or additionally, in response to receiving a request to update surface area data and/or image data for the property of interest, the aerial image data may be requested and subsequently retrieved by the structure detection system 40, where the aerial image data corresponds to one or more coordinates of a target property or property of interest (e.g., property owned by an insured or property that an insurance provider wants to analyze for structural changes). The target property may correspond to a property of interest that an interested party (e.g., insurance provider) may want to evaluate for structural changes to the property and changes in the surface area of such structures. As such, the first set of image data may feature a variety of property types and structure types in a variety of environments. Further, the image data may include metadata or other data characteristics that may provide time information, location information, device information, user information, and other information that may be related to the environment in which the image data was acquired.

At block 104, the structure detection system 40 may determine architectural or environmental characteristics of the property or structures represented in the first set of image data. In some embodiments, the structure detection system 40 may prompt a user to input the type of structure (e.g. residential, commercial, agricultural, industrial, skyscraper, or other type of building) via a visualization, a graphical user interface, a notification transmitted to a computing device associated with the user, or the like. As described above, the image data may be collected in a variety of environments and may represent a variety of property or structure types. Different structure detection models may include different model parameters depending on the type of structure or environmental contexts. That is, different types of properties, environments, and structures may look different and, therefore, have different architectural and environmental properties. As such, various structure detection models may be generated and stored by the structure detection system 40 that correspond to the various architectural or environmental properties that may be represented by different properties and structures in various environments. For example, a single-family home in a suburban environment may correspond to a different structure detection model than an office building in an urban environment. As such, the structure detection system 40 may more accurately detect a structure within a property of interest in a certain context if architectural and environmental characteristics are also determined.

At block 106, the structure detection system 40 may apply the appropriate structure detection model based on the determined architectural and environmental characteristics of the property or structures in the first set of image data. That is, the structure detection system 40 may receive or retrieve the appropriate model from a storage component. In some embodiments, the structure detection system 40 may send a request to a server or other cloud computing system, which may provide a suitable structure detection model for the structure detection system 40 to use.

At block 108, the structure detection system 40 may predict whether one or more structures is present in the area and, if so, the boundaries or contours of each of the one or more structures based on the first set of image data and the structure detection model. That is, the structure detection system 40 may employ the structure detection model to identify one or more structures that may be present within the area represented in the first set of image data based on the features trained and calibrated in the structure detection model.

In block 110, after the structure detection system 40 predicts whether one or more structures is present in the area based on the model, the property of interest within the area may be identified using property line data. In some embodiment, the property line data may be obtained via a third party such as a public database, a professional land surveyor, an online mapping tool, deed records, a title company, or other source of property line information. In this way, the property of interest may be differentiated from other properties in the area.

In block 112, once the property of interest has been identified, the structure detection system 40 may then mask other structures outside the property of interest based on the property line data. That is, other structures identified by the structure detection model that are outside the property boundaries of the target property may be selectively hidden such that only the structures within the property boundaries of the property of interest are revealed. Thus, this process is used to eliminate all other structure boundaries or contours that are found outside the property boundaries associated with the property of interest, leaving only the structures that sit within the property of interest.

In block 114, the structure detection system 40 may then calculate a first surface area of each contour associated with the isolated structure within the property of interest. In doing so, an insurance provider may implement or adjust insurance policies based on the amount of change in surface area of structures on the property of interest, as described in greater detail below. The surface area may be calculated using one or more mathematical formulas. The surface area may be calculated using square units such as square feet, square centimeters, square inches, square meters, or any other suitable square unit.

Figure 4:
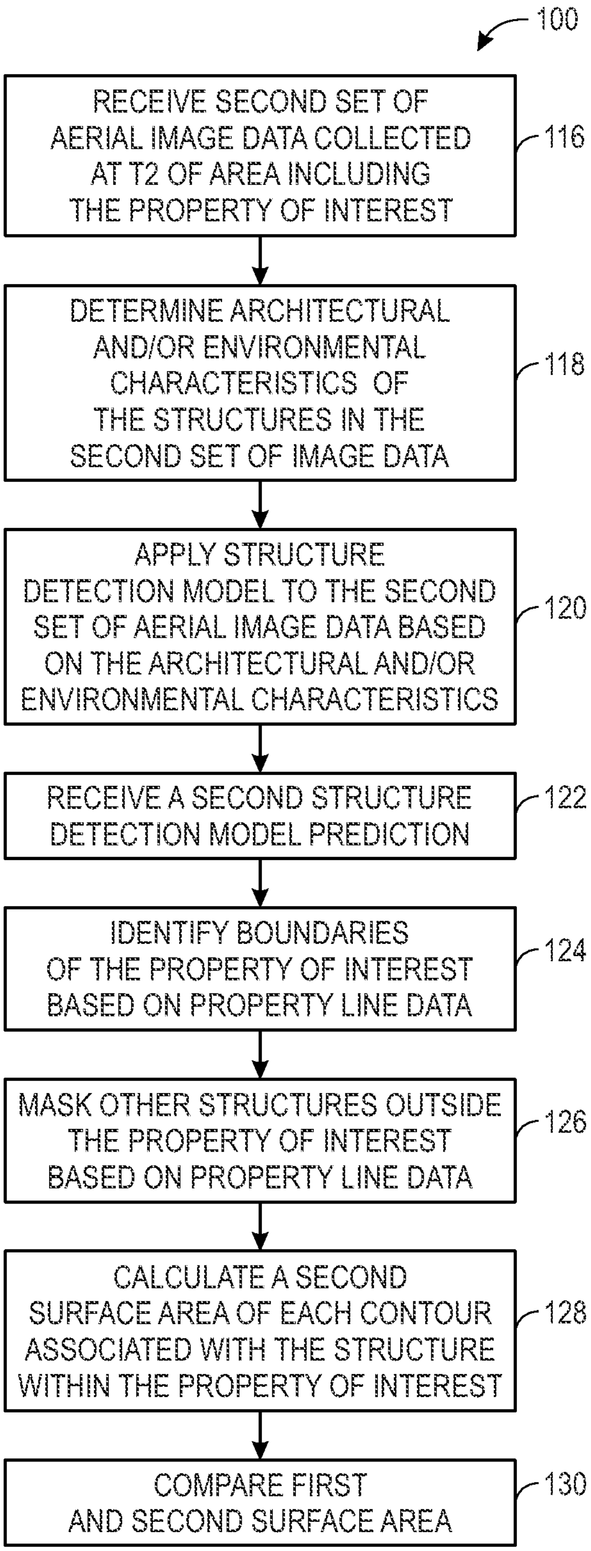
FIG. 4 illustrates a flow diagram of an example method of structure detection using the structure detection model, in accordance with an aspect of the present disclosure.

With the following in mind, FIG. 4 illustrates a flow chart of the method 100 for detecting a structure within a property of interest and calculating the surface area of the structure at a different timepoint. That is, any structures within the property of interest may be identified and the surface area calculated based on two different images of the same property of interest at two different periods of time. In this way, the surface area of the structures located within the property of interest may be compared over time to detect any changes in structure surface area. This is achieved by calculating the surface area of the structure at T1 and again at T2 and comparing the surface areas.

As shown in FIG. 4, at block 116, the structure detection system 40 may receive a second set of aerial image data of an area that includes the same property of interest that was represented in the first set of aerial image data at block 102. The second set of image data is thus collected at a second timepoint (e.g. T2). The second timepoint T2 may be a subsequent or later timepoint than the first timepoint, T1. Alternatively, or additionally, in response to receiving a request to update surface area data and/or image data for the property of interest, the aerial image data may be requested and subsequently acquired and/or retrieved by the structure detection system 40, where the aerial image data corresponds to one or more coordinates of a target property or property of interest. In this way, an interested party (e.g., insurance provider) may evaluate the property of interest for any structural changes and, therefore, any changes in the surface area of such structures. In an embodiment, the structure change detection system 40 may schedule periodic reviews of structures covered by the system 40, such as weekly, monthly, yearly or biyearly. Thus, the period of time between T1 and T2 may be about a week, about a month, about a year, or about every other year. Like the first set of image data, the second set of image data may feature a variety of property types and structure types in a variety of environments. Further, the image data may include metadata or other data characteristics that may provide time information, location information, device information, user information, and other information that may be related to the environment in which the image data was acquired.

At block 118, the structure detection system 40 may determine architectural or environmental characteristics of the property or structures represented in the second set of image data. In some embodiments, the structure detection system 40 may prompt a user to input the type of structure (e.g. residential, commercial, industrial, skyscraper, or other type of building) via a visualization, a graphical user interface, a notification transmitted to a computing device associated with the user, or the like. As described with respect to FIG. 3, various structure detection models may be generated and stored by the structure detection system 40 that correspond to the various architectural or environmental properties that may be represented by different properties and structures in various environments. As such, the structure detection system 40 may more accurately detect a structure within a property of interest in a certain context if architectural and environmental characteristics are also determined.

At block 120, the structure detection system 40 may apply the appropriate structure detection model based on the determined architectural and environmental characteristics of the property or structures in the first set of image data. That is, the structure detection system 40 may receive or retrieve the appropriate model from a storage component. In some embodiments, the structure detection system 40 may send a request to a server or other cloud computing system, which may provide a suitable structure detection model for the structure detection system 40 to use.

At block 122, the structure detection system 40 may predict whether one or more structures is present in the area and, if so, what the boundaries or contours are for each of the one or more structures based on the first set of image data and the structure detection model. That is, the structure detection system 40 may employ the structure detection model to identify one or more structures that may be present within the area represented in the first set of image data based on the features trained and calibrated in the structure detection model.

In block 124, after the structure detection system 40 predicts whether one or more structures is present in the area based on the model, the same property of interest identified in block 110 may be identified again in the second set of image data collected at T2. Like block 110, this process may be completed using property line data. In some embodiment, the property line data may be obtained via a third party such as a public database, a professional land surveyor, an online mapping tool, deed records, a title company, or other source of property line information. In this way, the property of interest at T2 may be once again differentiated from other properties in the area.

In block 126, once the property of interest has been identified, the structure detection system 40 may then mask other structures outside the property of interest based on the property line data. That is, other structures identified by the structure detection model that are outside the property boundaries of the target property may be selectively hidden such that only the structures within the property boundaries of the property of interest are revealed or such that only data associated with the structures within the property boundaries of the property of interest is considered or used to calculate surface area.

In block 128, the structure detection system 40 may then calculate a second surface area of each contour associated with the isolated structure(s) within the property of interest. In block 130, the first surface area calculated at block 114 and the second surface area calculated at block 128 may be compared. That is, the images of a same property can be collected at different timepoints. Differences in calculated square footage based on the disclosed image segmentation model can be identified using the image data. In doing so, an insurance provider may implement or adjust insurance policies based on the amount of change in surface area of structures on the property of interest. In an embodiment, the updated square footage at T2 is stored as a baseline or comparison value, thus serving as the T1 value for subsequent analysis at a later timepoint.

Figure 5:
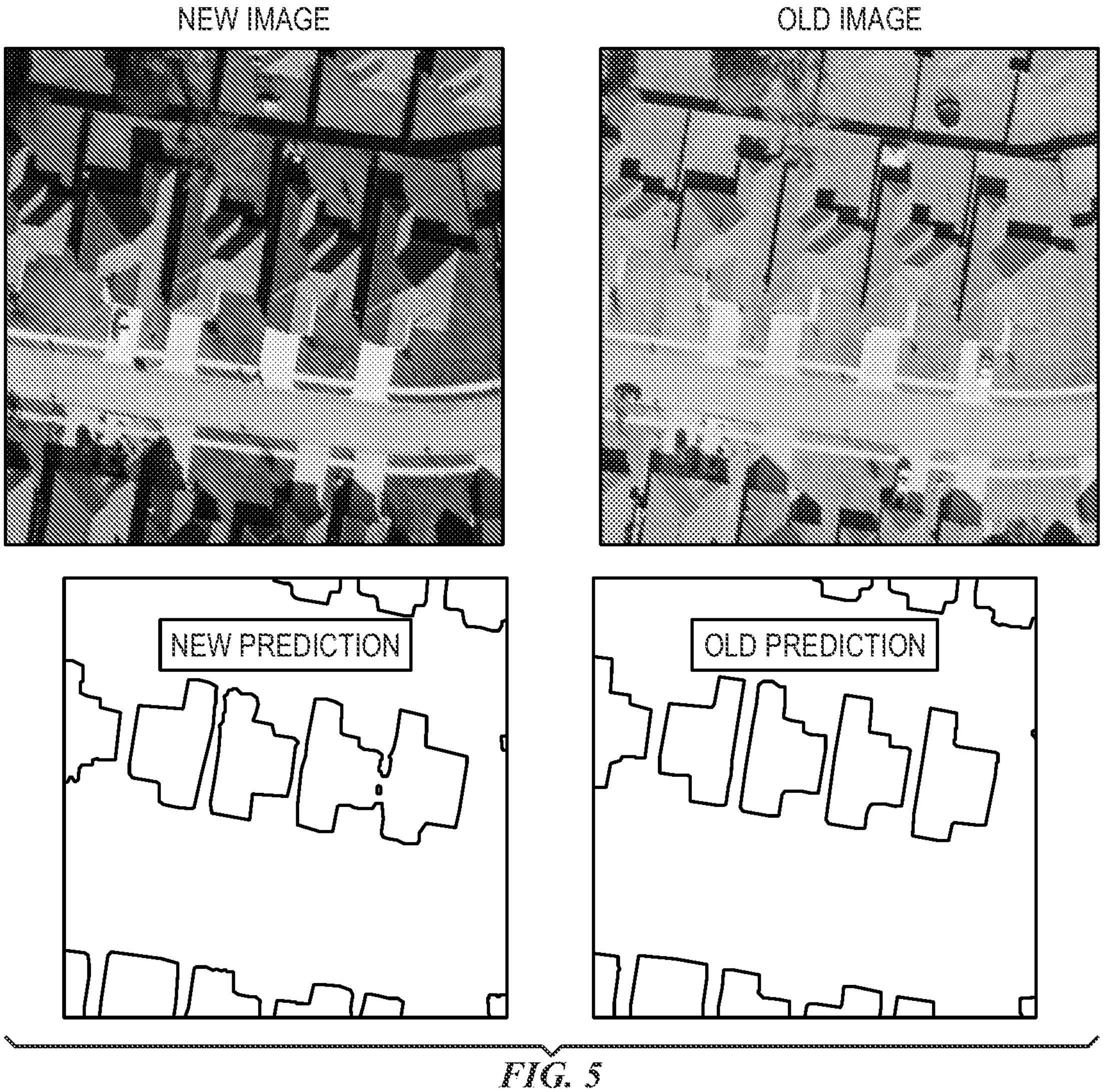
FIG. 5 illustrates aerial images and corresponding new and old structure predictions generated by the structure detection model, in accordance with an embodiment of the present disclosure.
Figure 6:
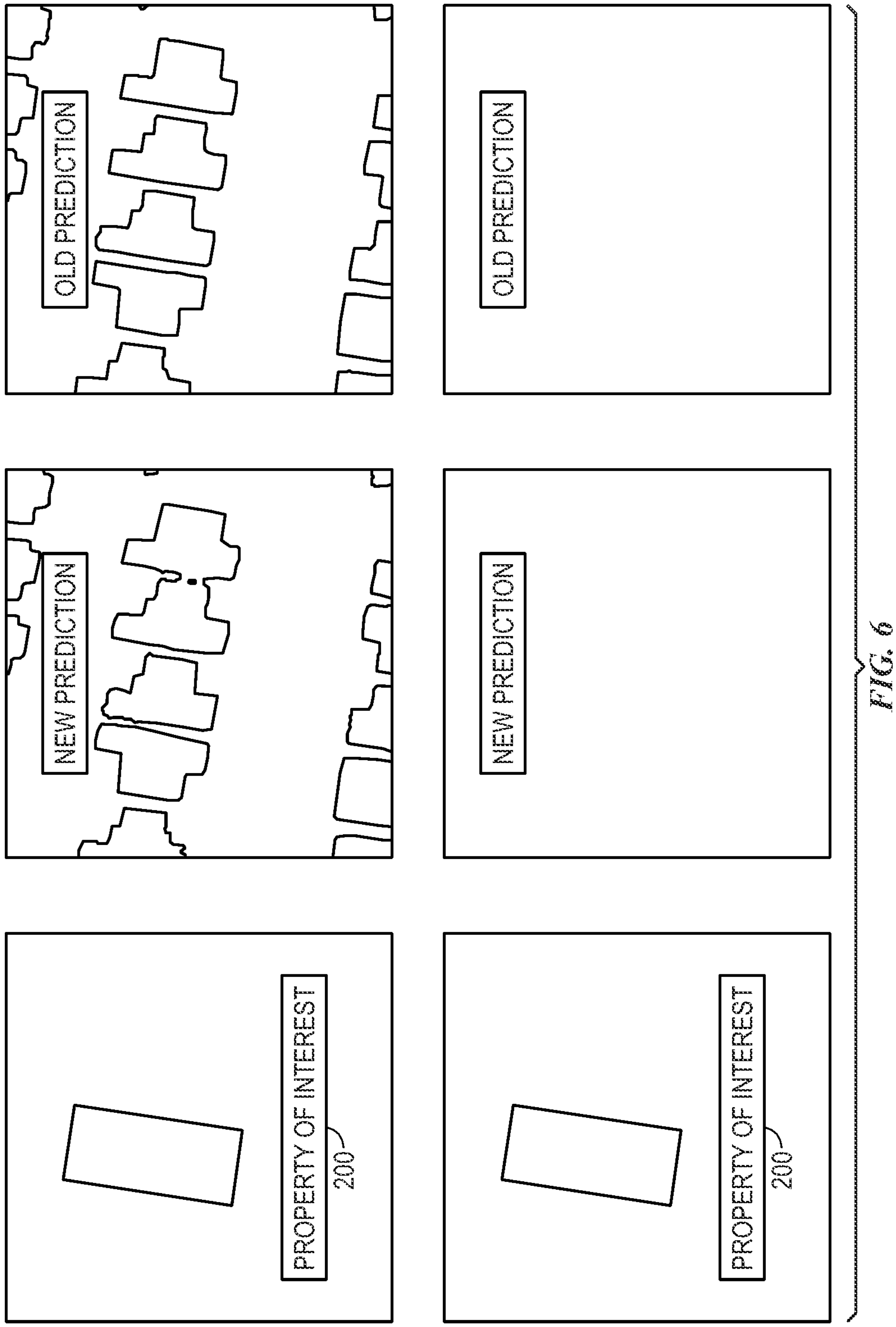
FIG. 6 illustrates an identified property of interest and corresponding new and old structure predictions within the property of interest and with and without masking of structures outside the property of interest, in accordance with an embodiment of the present disclosure.
Figure 7:
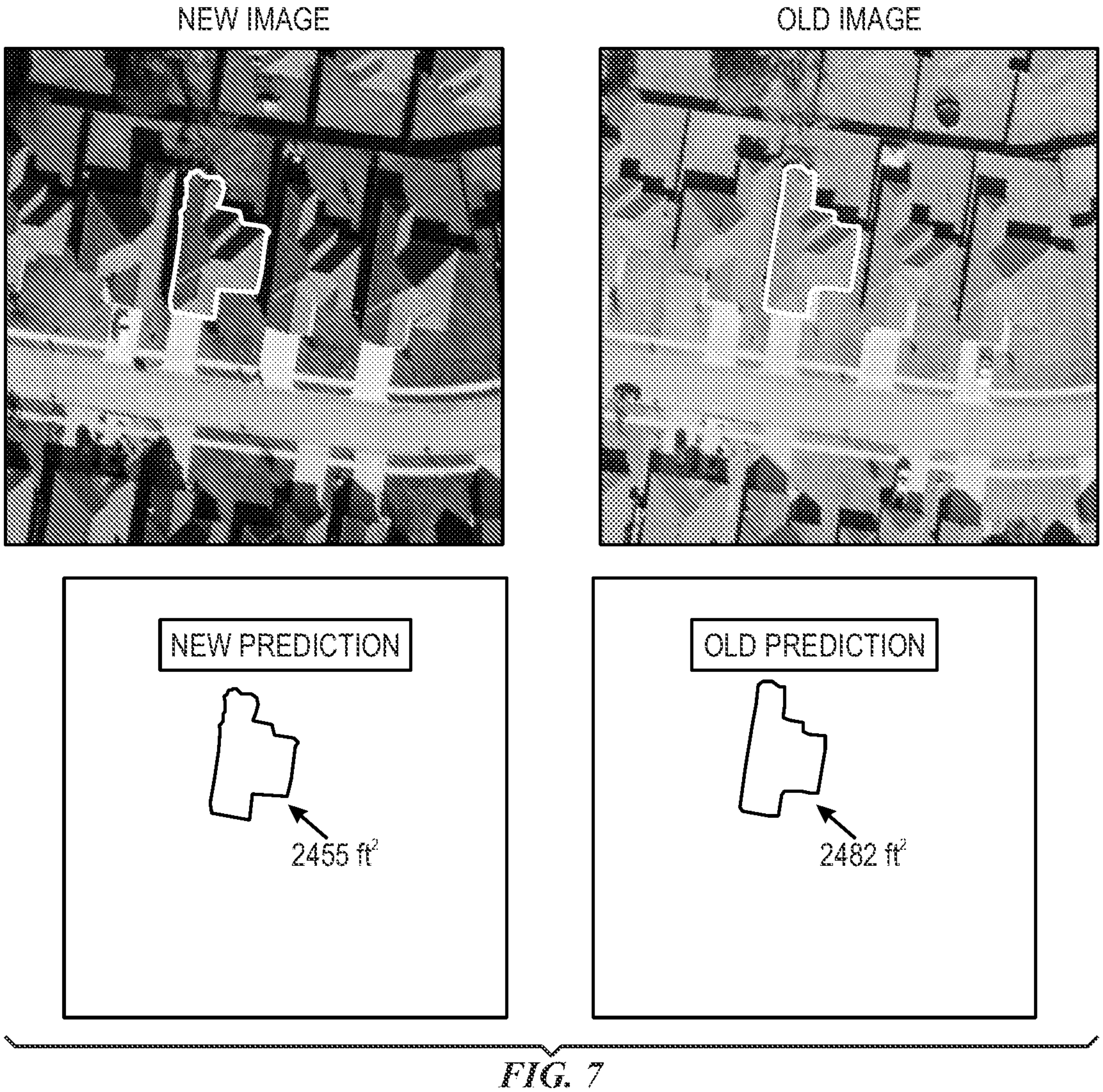
FIG. 7 illustrates aerial images and corresponding new and old structure predictions generated by the structure detection model including the calculated surface area using the new and old structure predictions, in accordance with an embodiment of the present disclosure.

The above-described method with respect to FIGS. 3 and 4 is demonstrated in FIGS. 5-7. FIG. 5 illustrates, according to one embodiment described herein, two aerial images of the same area taken at two different times. The depicted area features multiple properties, including the property of interest to be identified as shown in FIG. 6. Below the new and old aerial images of the area is an example of a structure prediction identified by the structure detection model. That is, the model identifies the presence of one or more structures in the area and predicts the boundaries or contours of each structure in the area. Each structure prediction corresponds to the relative set of image data it is based on. That is, the new structure prediction corresponds to the new image data of the area (e.g. the area at T1), which the old structure prediction corresponds to the old image data of the area (e.g. the area at T2).

Referring now to FIG. 6, FIG. 6 illustrates a structure detection model prediction of one or more structures located within the property boundaries associated with the property of interest 200. That is, after the structure detection system 40 identifies one or more structures in the area, the property of interest 200 within the area may be identified using property line data. In this way, the property of interest 200 may be differentiated from other properties in the area. The structure detection system 40 may then mask other structures outside the property of interest 200 based on the property line data. That is, other structures identified by the structure detection model that are outside the property boundaries of the target property may be masked such that only the structures within the property boundaries of the property of interest 200 are revealed. As shown in FIG. 6, the boundaries associated with the property of interest 200 at T1 and T1 are represented on the far right. Then, using the structural model predictions, represented by the top middle and top left boxes, the structure detection system 40 may mask other structures that are outside the boundaries of the property of interest 200. In this way, only the structure(s) located within the property of interest 200 are revealed, as shown in FIG. 6 represented by the bottom middle and bottom left boxes. Each structural prediction for the property of interest 200 respectively corresponds to old and new image data. That is, the old structural prediction for the property of interest 200 (i.e. bottom left) corresponds to old image data, or image data taken at T1. The new structural prediction for the property of interest 200 (i.e. bottom middle) corresponds to new image data, or image data taken at T2. In this way, the new and old predictions of the structure(s) present within the property of interest 200 may provide insight as to any structural changes and, therefore, surface area changes to the property of interest 200.

Referring now to FIG. 7, FIG. 7 illustrates two aerial images of the same area taken at two different times (e.g. old and new). The depicted area in the aerial image features multiple properties. Below the aerial image, however, are two structure detection model predictions of a structure located within the property the property of interest. That is, the model identified the presence of at least one structure within the property of interest and predicted the boundaries or contours of that structure two time-once based on the old image data and then again based on the new image data. Each structure prediction (new and old) corresponds to the relative set of image data it is based on. That is, the new structure prediction corresponds to the new image data of the area (e.g. the area at T1), while the old structure prediction corresponds to the old image data of the area (e.g. the area at T2). As shown in FIG. 7, the structure detection system 40 may calculate a first surface area corresponding to the old prediction and a second surface area corresponding to the new prediction. The first surface area calculated and the second surface area may then be compared. In doing so, an insurance provider may implement or adjust insurance policies based on the amount of change in surface area of structures on the property of interest.

Figure 8:
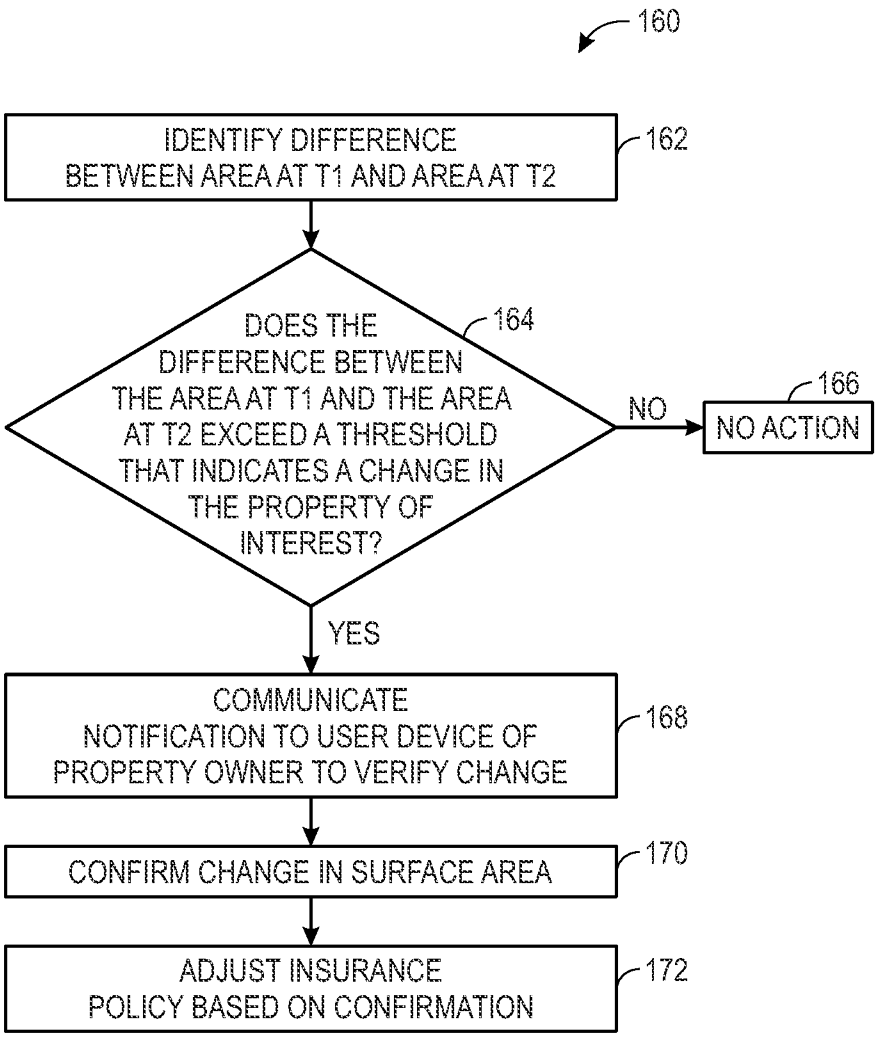
FIG. 8 is a flowchart of a process for confirming identified structural changes within a property of interest.

Referring now to FIG. 8, FIG. 8 illustrates a flowchart of a process 160 for confirming structural changes within a property of interest. Although the following description of the process 160 will be described as being performed by the structure detection system 40, it should be noted that any suitable computing device may perform the process 160. At step 162, the structure detection system 40 may compare the surface areas of a structure within a property of interest calculated at a first timepoint (i.e. T1) and at a second timepoint (i.e. T2). The structure detection system 40 may then identify the difference between the area at T1 and the area at T2.

At step 164, the structure detection system 40 may then determine if the difference between the area at T1 and the area at T2 exceeds a threshold that indicates a change in the property of interest (e.g. a property addition). For example, as shown in FIG. 7, the surface area at T1 (i.e. the old prediction) was 2,482 square feet, while the surface area at T2 (i.e. the new prediction) was 2,455 square feet. As such, the structure detection system 40 may determine that there is a difference between the two surface areas, that the difference in square footage is 27 square feet, and that this difference is about a 1% difference. Such a small different may be attributed to a tree overhang that may cover a portion of the roof, for example. Such an overhang may be more predominant in the new prediction (i.e. T2), and therefore may make the contour prediction smaller at T2. In such cases, due to the size difference being minimal, the structure detection system 40 may determine that the surface area difference does not exceed the threshold indicative of a change. As described above, the structure detection model may be adjusted to recognize and account for possible tree overhang or other elements that are adjacent to but not part of the property of interest. In an embodiment, the structure detection model may use a time of day as input to the structure detection model. For example, if the image data is acquired at noon, a shadow pattern on the image may be more or less pronounced relative to morning, afternoon, or evening images. Because shadows may obscure detectable portions of a roof, a heavier shadow pattern may be associated with a false decrease in the detected surface area. Thus, the structure detection model may correct for times of day associated with heavier shadow patterns at the property location. The structure detection model may be trained on images taken at various times of day and at locations in the geographic area of the property of interest or past images of the property of interest. Similarly, a shadow pattern may be affected by season, such that bare trees in winter cast fewer shadows than the same trees with full foliage in the summer. Thus, an image of a structure of a property location taken in the winter may falsely appear to have a larger roof and, therefore, larger calculated surface area, relative to results from an image of the structure at the property location taken in the summer. In an embodiment, a presence of snow may obscure detectable portions of the roof. The structure detection model may be trained on images taken at various times of the year in the geographic area of the property of interest or past images of the property of interest and may use season or date of the acquired images as an input to the model to correct for season-associated affects. Additionally, or alternatively, the threshold may be adjusted based on the type and size of the property of interest. That is, the threshold may be adjusted such that a minimum difference in square units corresponds to an amount of change that may be expected if there was a change to the property such that it would affect the insurance policy.

If the difference is below a threshold, as shown in step 166, then the insurer takes no action. If, however, the different exceeds the threshold, as shown in step 168, then the insurer may communicate a notification to a user device of the owner of the property of interest (i.e. the insured) to verify the change and to confirm the surface area. In some embodiments, the notification may include an interactive GUI of an application installed on the user device that, when engaged with by the user, may guide the user device to a camera interface to take pictures of the property of interest to confirm the change. That is, the notification or interactive GUI may include a request to activate a camera interface of the user device so that the user may collect additional image data of the property of interest. The additional image data may include exterior or interior images of the property of interest. Further, in some embodiments, the structure detection system 40 may then re-calculate the surface area of the property of interest based on the additional image data collected by the owner of the property. In such embodiments, the structure detection system 40 may then update the surface area prediction at time T2 with the re-calculated surface area based on the additional image data. The structure detection system 40 may then compare the old surface area prediction calculated at T1 with the updated T2 surface area prediction. In this way, the re-calculated surface area at T2 may be used to confirm a change in the surface area of the property of interest, as shown in step 170, thereby also provide a more accurate insurance quote, as shown in step 172. Additionally, the re-calculated surface area at T2 may be applied to the structure detection model to train the model by associating the re-calculated surface area with the second set of aerial image data originally used to calculate the surface area at T2. In some cases, the additional image data collected by the owner of the property may confirm there is no change to the property of interest. Alternatively, the additional image data may reveal that the larger surface area calculated at T2 was due to an addition made to the property of interest that does not affect the insurance quote. For example, a homeowner may add a porch to the property of interest, which does not affect the insurance quote. In such cases, the additional image data may be used to dismiss the notification.

While only certain features of disclosed embodiments have been illustrated and described herein, many modifications and changes will occur to those skilled in the art. It is, therefore, to be understood that the appended claims are intended to cover all such modifications and changes as fall within the true spirit of the present disclosure. It should be appreciated that features discussed with references to different examples provided herein may be combined. Features shown and described with reference to FIGS. 1-8 may be combined in any suitable manner.

The invention claimed is:

1. A system for detecting structures in an aerial image, comprising:
- one or more processors configured to:
- receive an aerial image associated with a property of interest;
- identify one or more boundaries associated with the property of interest;
- apply a structure detection model to the aerial image to detect contours of one or more structures within the boundaries of the property of interest;
- calculate a surface area of the detected one or more structures,
- determine the surface area is less than a threshold amount different than a previous surface area; and
- based on determining the surface area is less than a threshold amount different than the previous surface area;
  - identify a shadow pattern corresponding to the property of interest;
  - compare the shadow pattern to an expected shadow pattern;
  - determine the shadow pattern does not match the expected shadow pattern; and
  - based on determining the shadow pattern does not match the expected shadow pattern, adjust the surface area.

2. The system of claim 1, wherein the one or more processors are configured to identify the one or more boundaries associated with the property of interest by using property line data.

3. The system of claim 1, wherein the one or more processors are configured to mask other structures, via the structure detection model, that are outside of the boundaries of the property of interest.

4. The system of claim 1, wherein the one or more processors are configured to communicate with a user device associated with a user and configured to operate an application associated with the structure detection model.

5. The system of claim 4, wherein the user is an owner of the property of interest.

6. The system of claim 4, wherein the application associated with the structure detection model is configured to prompt the user via the user device to input a type of structure prior to applying the structure detection model.

7. The system of claim 6, wherein the structure detection model is applied based on the type of structure.

8. The system of claim 1, wherein the structure detection model uses a time of year at which the aerial image was acquired as input to the structure detection model.

9. The system of claim 1, wherein the structure detection model uses a time of day at which the aerial image was acquired as input to the structure detection model.

10. A method for detecting structural changes within a property of interest, comprising:
- receiving a first set of aerial image data collected at a first timepoint, wherein the first set of aerial image data comprises the property of interest, and wherein the property of interest comprises one or more structures;
- determining a type of structure of the one or more structures;
- determining one or more boundaries of the property of interest;
- applying a structure detection model to the first set of aerial image data based on the determined structure type, wherein applying the structure detection model comprises:
- masking other structures outside the one or more boundaries of the property of interest;
- isolating the one or more structures within the one or more boundaries of the property of interest; and
- identifying a first set of contours of the one or more structures;
- calculating a first surface area of the first set of contours of the one or more structures;
- determining the first surface area is less than a threshold amount different than a previous first surface area; and
- based on determining the first surface area is less than the threshold amount different than the previous first surface area;
  - identifying a shadow pattern corresponding to the property of interest;
  - comparing the shadow pattern to an expected shadow pattern;
  - determining the shadow pattern does not match the expected shadow pattern; and
  - based on determining the shadow pattern does not match the expected shadow pattern, adjusting the first surface area.

11. The method of claim 10, comprising:
receiving a second set of aerial image data collected at a second timepoint, wherein the second set of aerial image data comprises the property of interest, and wherein the property of interest comprises the one or more structures, one or more additional structures, or both;
determining the one or more boundaries of the property of interest;
applying the structure detection model to the second set of aerial image data based on the determined structure type;
identifying a second set of contours of the one or more structures, the one or more additional structures, or both;
calculating a second surface area of the second set of contours; and
identifying a difference between the adjusted first surface area and the second surface area.

12. The method of claim 11, comprising sending a notification to a user device in response to the difference between the adjusted first surface area and the second surface area exceeding a threshold.

13. The method of claim 12, wherein the user device is associated with an owner of the property of interest and is configured to operate an application associated with the structure detection model.

14. The method of claim 13, wherein the application, via the notification, is configured to prompt the user to confirm the detected change in the property of interest.

15. The method of claim 14, comprising adjusting an insurance policy associated with the property of interest in response to the user confirming the detected change in the property of interest.

16. The method of claim 14, comprising updating the structure detection model in response to the user indicating no changes to the property of interest.

17. A tangible, non-transitory, computer-readable medium, comprising computer-readable instructions that, when executed by one or more processors, cause the one or more processors to:
receive aerial image data associated with a property of interest;
identify one or more boundaries of the property of interest;
apply, using machine learning, a structure detection model to the aerial image data, to identify one or more structures within the one or more boundaries of the property of interest and contours of the one or more structures, wherein the machine learning is configured to utilize past image data to detect patterns that identify properties associated with structures;
calculate a surface area of one or more contours associated with the one or more structures;
determine the calculated surface area is less than a threshold amount different than a previous surface area; and
based on determining the calculated surface area is less than a threshold amount different than a previous surface area;
identify a shadow pattern corresponding to the property of interest;
compare the shadow pattern to an expected shadow pattern;
determine the shadow pattern does not match the expected shadow pattern; and
based on determining the shadow pattern does not match the expected shadow pattern, adjust the calculated surface area; and
use the adjusted calculated surface area to detect changes in the surface area over time.

18. The tangible, non-transitory, computer-readable medium of claim 17, wherein the machine learning is configured to:
mask other structures outside the one or more boundaries of the property of interest;
isolate the one or more structures within the one or more boundaries of the property of interest.

19. The tangible, non-transitory, computer-readable medium of claim 17, wherein identifying the one or more boundaries of the property of interest comprises using property line data associated with the property of interest.

20. The tangible, non-transitory, computer-readable medium of claim 17, wherein the machine learning is configured to alter the aerial image data using image augmentation, horizontal flipping, adding noise, and/or cropping.

* * * * *